United States Patent [19]

Bauer et al.

[11] 3,716,615

[45] Feb. 13, 1973

[54] PROCESS FOR THE PRODUCTION OF CUPROUS OXIDE

[75] Inventors: Donald J. Bauer; Philip R. Haskett; Roald E. Lindstrom, all of Reno, Nev.

[73] Assignee: The United States of America as represented by the Secretary of the Interior

[22] Filed: Aug. 24, 1971

[21] Appl. No.: 174,541

[52] U.S. Cl.....................................................423/35
[51] Int. Cl..............................C01g 3/02, C22b 3/00
[58] Field of Search ....23/147, 148; 75/72, 108, 117; 423/35

[56] References Cited

UNITED STATES PATENTS

| | | | |
|---|---|---|---|
| 3,438,767 | 4/1969 | Busch | 75/117 |
| 3,532,490 | 10/1970 | Burkin | 75/117 |
| 3,492,115 | 1/1970 | Mahalla | 75/117 |

*Primary Examiner*—Oscar R. Vertiz
*Attorney*—Ernest S. Cohen et al.

[57] ABSTRACT

$Cu_2O$ is precipitated from a copper chelate solution by the addition of alkaline material and a reductant. The stability constant of the chelate must be more than 5.

11 Claims, No Drawings

PROCESS FOR THE PRODUCTION OF CUPROUS OXIDE

The invention relates to the production of cuprous oxide ($Cu_2O$).

Heretofore cuprous oxide has been produced by heating a mixture of copper oxide and copper to above 1,000°C, and cooling in an inert atmosphere. Another method has been to blow air through molten copper and remove the $Cu_2O$ which forms on the surface. It has also been prepared electrolytically using copper electrodes. All these known methods, however, are high cost operations and somewhat complex.

We have now discovered a new and improved $Cu_2O$ preparation technique in which cuprous oxide is produced by precipitating it from copper chelate solution in which the chelate has a stability constant greater than 5. Such solutions are formed, for example, as described in co-pending application Ser. No. 845,905 filed July 29, 1969, now U.S. Pat. No. 3.634,070 or by simply adding a chelating agent directly to an existing copper-bearing inorganic salt solution. Generally, the precipitation is accomplished by raising the solution pH above 9 through the addition of an alkaline material, and then injecting a reducing agent such as hydrogen, carbon monoxide, formaldehyde, etc.

It is therefore an object of the present invention to produce $Cu_2O$ from a copper bearing material.

Another object is to remove copper essentially as $Cu_2O$ from a chelate solution.

A still further object is to separate out copper as $Cu_2O$ from other metals in a copper chelate solution.

In the practice of the present invention the copper chelate solution is formed in any number of manners. As an example, copper is extracted from an ore or concentrate with a chelate solution as disclosed in said copending application Ser. No. 845,905 now U.S. Pat. No. 3,634,070. Alternatively, copper scrap is dissolved in a chelate solution; or an inorganic copper salt solution is formed, for example, by leaching a copper-bearing material with an inorganic acid such as HCl or $H_2SO_4$, after which a copper chelating agent is injected into the solution.

Any organic chelating agent which forms a copper chelate having a stability constant greater than 5 (log $K_1 > 5$) will function properly in the process of the present invention. Although not conventionally shown, the dimensions for stability constants may be represented as moles$^n$/liter$^n$. Most amino-polycarboxylic acid chelating agents will form copper chelates having sufficiently high stability constants. A discussion of stability constants of chelates (also called equilibrium constants or formation constants) is given in *Chemical Engineering*, Nov. 27, 1961, at page 96, and in "Stability Constants of Metal-Ion Complexes" by L. G. Sillen and A. E. Martell, Special Publications No. 17, London-The Chemical Society, Burlington House W1 1964. In the present invention, generally the ratio of chelating agent to copper will be greater than 1:1 mole ratio, preferably at least 1.2:1, to insure a high yield of pure product. If a high recovers is not desirable a 1:10 ratio may suffice.

Reducing agents can be either gaseous (e.g. hydrogen, carbon monoxide, methane, etc.,) or compounds such as formaldehyde or sodium hydrosulfite. With gaseous reductants such as $H_2$ and CO, chelate stability constants should be greater than 15 in order to obtain results superior to liquid reductants such as formaldehyde. With further regard to gaseous reductants, operating pressures are generally about 100–400 psig, and solution temperature about 60° to 150°C. In addition, it is desirable to maintain solution temperatures as low as possible when employing gaseous reductants in order to prevent chelating agent decomposition. It is also important to carefully determine maximum contact times because too long a reaction may result in copper metal production.

As to solution of reductants such as formaldehyde, atmospheric pressure is suitable, and solution temperatures generally are about 10° to 90°C.

In order to insure a high recovery of copper as $Cu_2O$, it is very important to carefully control the pH of the system since the cuprous oxide reduction product apparently goes through a hydroxide intermediate phase. If the pH is 9 or below there will be very little recovery unless impractically long contact times are employed. On the other hand the presence of too large amounts of alkaline material contaminates the product with large quantities of CuO.

Optimum hydroxide concentration ranges are best determined experimentally for a particular chelating agent and reductant, and for a particular copper-chelating agent ratio. For example, the pH should be above 9 and up to 14 when employing EDTA, NTA, DTPA chelating agents and $H_2$, CO, formaldehyde reductants, and when employing a chelating agent: copper mol ratio of about 1.2:1.

To adjust pH, an alkaline material such as an alkali metal hydroxide, $Ba(OH)_2$, etc., is employed.

The following examples illustrate how effectively copper is removed as $Cu_2O$ from a chelate solution by the process of the present invention.

EXAMPLE A

A solution was prepared containing 6.3g of copper, 40g of $Na_3HEDTA$ (trisodium salt of ethylenediaminetetraacetic acid) and 15g of NaOH which gave a pH of about 13. The solution (500 ml) was placed in an autoclave at 400 psig of $H_2$ pressure and reacted at 118°C for 2 hours. The resulting precipitate was analyzed according to ASTM procedure D283–52 and found to be 99.7 percent pure $Cu_2O$. Colorometric analysis of the remaining solution showed that 99 percent of the copper had precipitated.

EXAMPLE B

A chelate solution was prepared by leaching a carbonate ore with DTPA (diethylenetriamine pentaacetic acid) in the manner of copending application Ser. No. 845,905. NaOH and $H_2$ were added to the solution in the manner of Example A, and the results were essentially the same as Example A.

EXAMPLE C

In another experiment, 6.3g of copper, 25g of NTA (nitrilotriacetic acid in the sodium salt form) and 9g of NaOH were placed in solution (500 ml), pH of about 13 and heated to 65°C. Ten ml of 36 percent formaldehyde solution was then added slowly to the stirred solution. The resulting precipitate analyzed 92 percent pure $Cu_2O$, and all of the copper was removed from solution.

The following example illustrates the effects of pH on the process of the present invention.

EXAMPLE D

Four 100 ml samples, each containing 6.3g of copper and 40g of $Na_3HEDTA$ was prepared. Each solution was autoclaved at 200 psig of $H_2$ pressure at 120°C for 1 hour. Varying amounts of NaOH were added prior to autoclaving. The results were as follows:

| | Amount of NaOH added, grams | Results |
|---|---|---|
| Sample 1 | 30 (pH>13) | Complete removal of copper from solution but product containined much CuO. |
| Sample 2 | 15 (pH>13) | Complete removal of copper from solution. Product > 99 percent pure $Cu_2O$. |
| Sample 3 | 7.5 (pH 13) | Product high purity $Cu_2O$ but some copper remaining in solution. |
| Sample 4 | 0 (pH 9) | Very little recovery from solution after 1 hour. At 4 hours reaction time had 50 percent recovery of good purity $Cu_2O$. |

We claim:
1. A process for preparing $Cu_2O$ comprising
    a. leaching copper values from a copper bearing ore or concentrate with a copper chelating organic agent, said agent forming a chelate with copper having a stability constant of more than 5, so as to form a copper chelate solution;
    b. contacting said solution with a reductant while said solution is at a pH of at least 13 in order to precipitate $Cu_2O$; and
    c. separating out said $Cu_2O$.
2. The process of claim 1 wherein said reductant is a gas, wherein reduction operating temperature is about 60° to 150°C, and wherein reduction pressure is about 100 to 400 psig.
3. The process of claim 1 wherein said chelating agent is an aminopolycarboxylic acid.
4. The process of claim 1 wherein the mol ratio of chelating agent to copper is at least 1:1.
5. The process of claim 1 wherein said reductant is a liquid and wherein reduction operating temperature is about 10° to 90°C.
6. The process of claim 1 wherein said reductant is selected from the group consisting of $H_2$, CO, $CH_4$, formaldehyde, and sodium hydrosulfite.
7. The process of claim 2 wherein said stability constant is at least 15 and wherein said reductant is selected from the group consisting of $H_2$, CO and $CH_4$.
8. The process of claim 3 wherein said agent is selected from the group consisting of ethylenediamiminetetraacetic acid, nitrilotriacetic acid, and diethylenetriamine pentaacetic acid, wherein said pH is up to 14, and wherein the chelating agent: copper mol ratio is at least 1.2:1.
9. A process for preparing $Cu_2O$ comprising
    a. forming a copper chelate solution in which the chelating agent is selected from the group consisting of ethylenediaminetetraacetic acid, nitrilotriacetic acid and diethylenetriamine pentaacetic acid; wherein the chelating agent: copper mol ratio is at least 1.2:1.
    b. adding alkaline material to said solution to adjust the pH to about 13–14;
    c. thereafter contacting said solution with a reductant to precipitate $Cu_2O$ from said solution; and
    d. separating out said $Cu_2O$.
10. The process of claim 9 wherein said reductant is a gas, and wherein the stability constant of said copper chelate is at least 15, and wherein said reductant is selected from the group consisting of $H_2$, CO and $CH_4$.
11. The process of claim 9 wherein said reductant is a liquid, and where reduction operating temperature is about 10° to 90°C.

* * * * *